United States Patent [19]
DeTroyer et al.

[11] 3,726,622
[45] Apr. 10, 1973

[54] COMPACTING APPARATUS

[75] Inventors: Georges D. DeTroyer, Grosse Ile; Raymond P. DeSantis, Royal Oak, both of Mich.

[73] Assignee: Wolverine-Pentronix, Inc., Lincoln Park, Mich.

[22] Filed: Aug. 20, 1971

[21] Appl. No.: 173,484

[52] U.S. Cl. ................ 425/78, 425/193, 425/345, 425/406
[51] Int. Cl. ........................................... B30b 11/04
[58] Field of Search .................. 425/78, 168, 193, 425/345, 406, 412

[56] References Cited

UNITED STATES PATENTS

| | | | |
|---|---|---|---|
| 3,469,283 | 9/1969 | Vinson | 425/78 |
| 3,561,056 | 2/1971 | Smith et al. | 425/168 X |
| 3,574,892 | 4/1971 | Smith | 425/78 |

*Primary Examiner*—J. Howard Flint, Jr.
*Attorney*—Robert C. Hauke et al.

[57] ABSTRACT

A powder compacting apparatus comprising a punch and die assembly having a die plate provided with at least a pair of rows of die cavities and with a reciprocable punch disposed in each die cavity. A work station positioner angularly movable across the upper surface of the die plate carries a station positioner block in which are formed a powder dispenser for each die cavity, an anvil surface for each row of die cavities and a pickup head for each die cavity. The powder dispensers and the pickup heads are disposed in rows corresponding to the rows of die cavities such that each row of powder dispensers, each anvil surface and each row of pickup heads are sequentially positioned, in timed relationship with the reciprocation of the punches, over each row of die cavities for filling the die cavities with powder material by means of the powder dispensers in a first angular position of the station positioner, compacting the powder material in each die cavity between the punch ends and the anvil surface in a second position of the station positioner and ejecting the compacted articles from the die cavities into the pickup heads in a third angular position of the station positioner.

7 Claims, 9 Drawing Figures

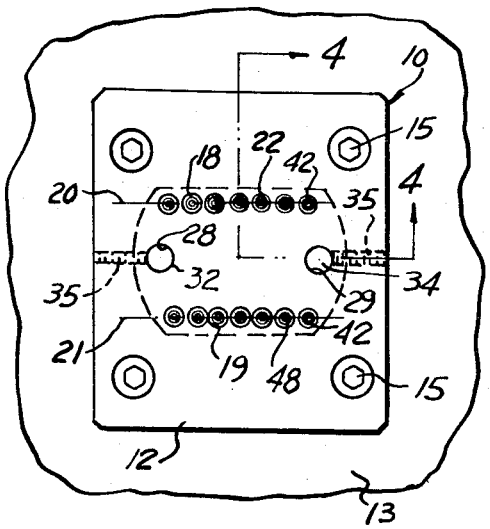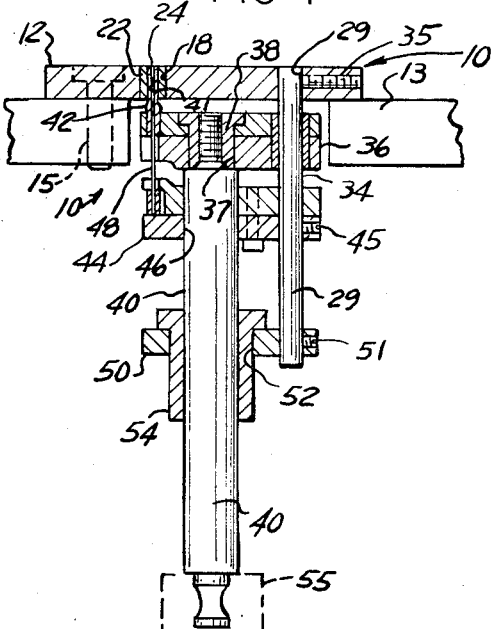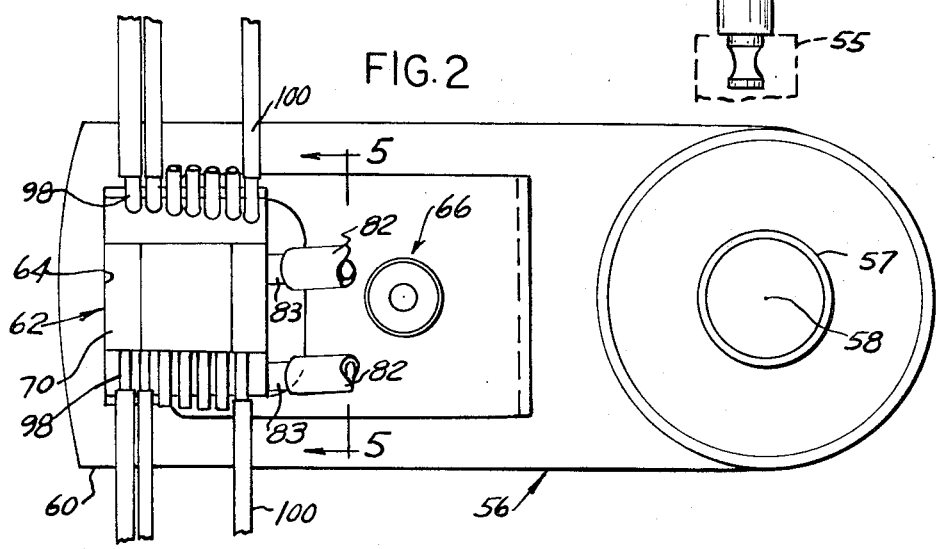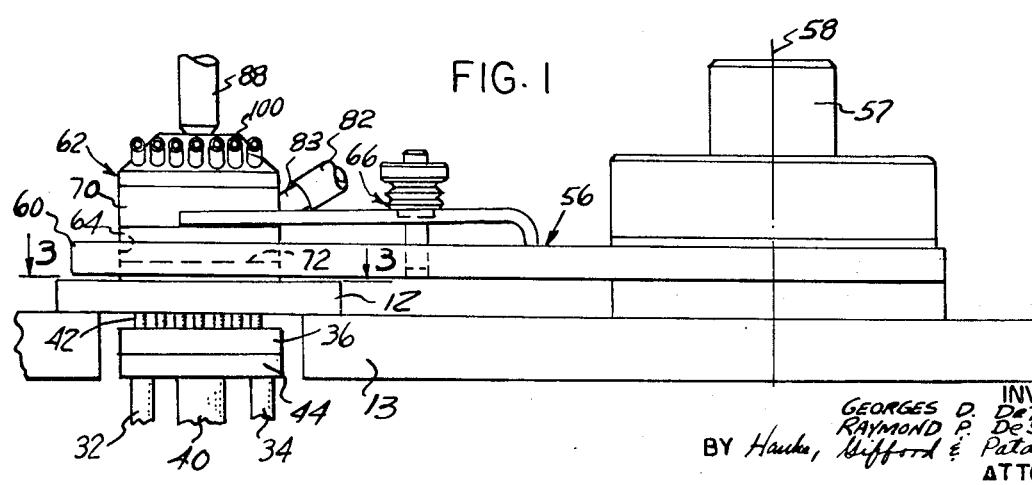

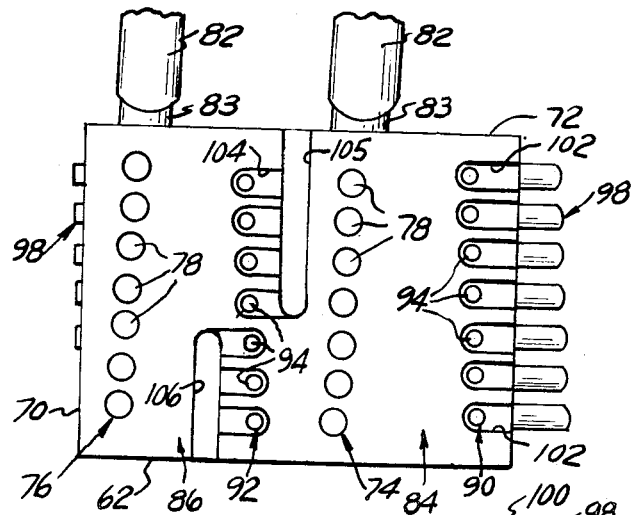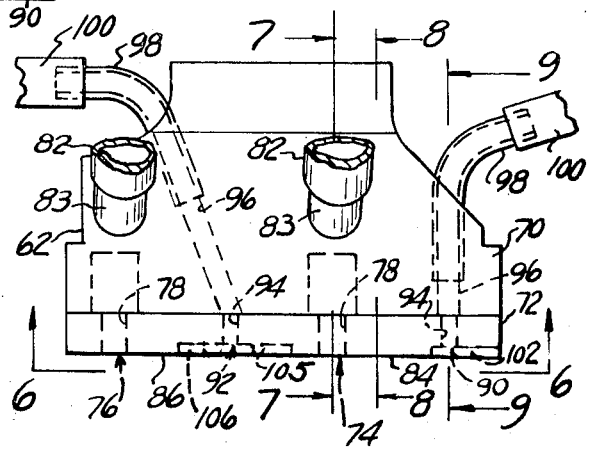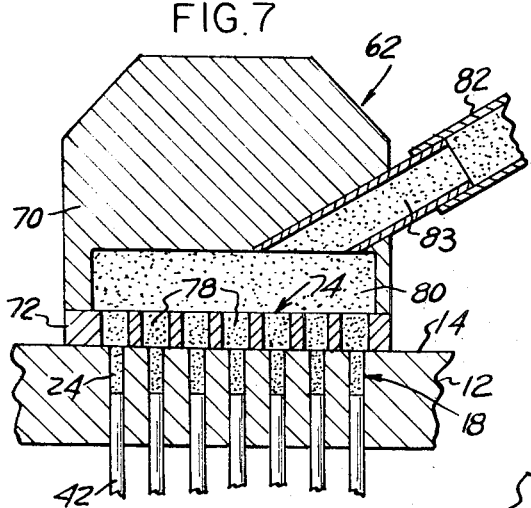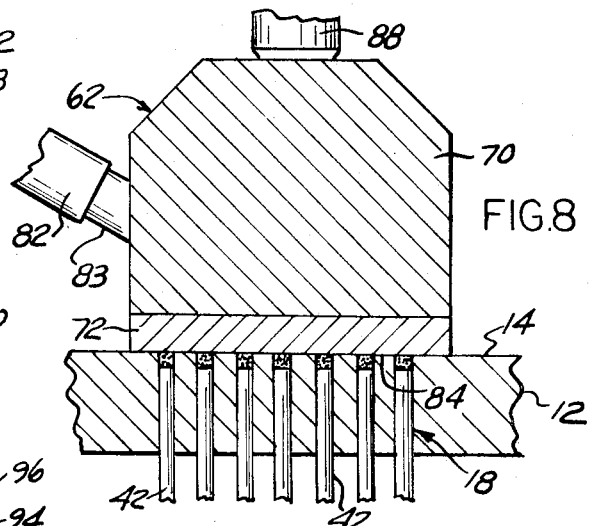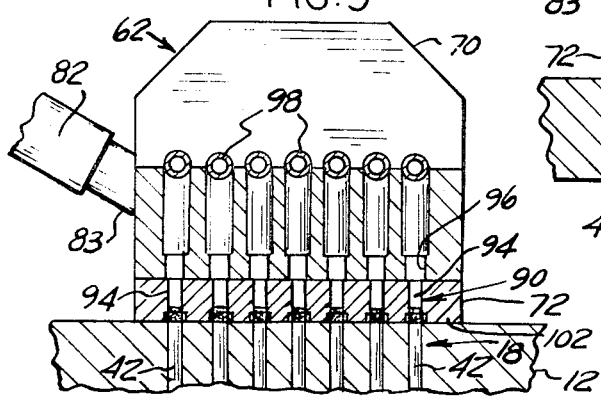

COMPACTING APPARATUS

BACKGROUND OF THE INVENTION

1. Field of the Invention

The present invention relates to powder compacting apparatus and, more particularly, to improved means for dispensing a powder material into a die cavity, compacting the powder into compacted articles, and ejecting the compacted articles from the die cavities.

2. Description of the Prior Art

The present invention is an improvement over a powder material dispenser, anvil, and pickup head of the character disclosed as part of the powder compacting apparatus disclosed in U.S. Pat. Nos. 3,328,840, 3,328,842, 3,344,213, 3,414,940, 3,415,142, 3,561,056 and 3,574,892, all assigned to the same assignee as the present application. The powder compacting apparatus described therein are machines for manufacturing of compacted articles, such as toroids, beads, pellets and the like made of powdered ferrite, glass or other powder substances capable of forming a compacted article upon the application of pressure in a confined die cavity. In the powder compacting apparatus disclosed in the aforementioned Patents, the articles are compacted and formed in a muti-cavity die, from which the compacted articles are automatically ejected and picked up by a pickup head which, in turn, drops the compacted articles through appropriate discharge ports into suitable receptacles.

A work station positioner assembly, which is part of the apparatus, is mounted angularly movable over the die plate and carries three separate elements, namely a powder dispenser unit, an anvil unit, and a pickup head unit. The powder dispenser unit, which is supplied with powder from a primary powder supply means connected thereto by means of a flexible tubing or the like, is first positioned over the die cavities to fill the die cavities with a predetermined amount of powder. The dispenser unit is then removed from above the die cavities by the subsequent angular motion of the station positioner assembly, and the anvil unit is in turn positioned over the die cavities. The anvil unit is clamped over the die cavities by suitable means, actuated in timed relation with the upward movement of the punches, such that the clamping means holds the anvil unit applied to the surface of the die plate with a sufficient pressure to permit the compaction of the powder material against the anvil surface as the result of the upward movement of the punches into the die cavities.

The anvil unit is then removed from its position over the die cavities and is replaced by the pickup head unit as a result of a further angular movement of the station positioner assembly across the face of the die plate. The punches are displaced upwardly so as to bring their upper ends in substantially flush alignment with the upper surface of the die plate, such that the finished compacted articles are ejected from the die cavities and picked up by the pickup head. The pickup head unit, as a result of the angular motion of the station positioner assembly returning the powder dispenser unit over the die cavities, is displaced to a position wherein the compacted articles are dropped through appropriate apertures in the die plate into suitable receptacles.

In such compacting presses, parts are manufactured at a substantially high rate of production which requires a highly accurate timing between the movement of the several components of the station positioner assembly and the punches so as to enable the filling of the die cavities, compaction of the articles therein, and ejection of the finished compacted articles without damage thereto.

In powder compacting apparatus where a plurality of die cavities are disposed in the die plate in a circular arrangement, a single circle or a plurality of concentric circles, the station positioner assembly is caused to sweep a substantial arcuate stroke over the surface of the die plate, because the station positioner assembly must be angularly displaced a distance corresponding to more than the diameter of the circle on which the die cavities are located in order to move the dispenser unit clear from over the die cavities and position the anvil unit over the die cavities, and subsequently move the anvil unit angularly out of position and place the pickup head unit in position over the die cavities. All those sequential motions of the station positioner assembly over considerable arcuate distances present the substantial problem of accelerating and decelerating the mass of the station positioner assembly in order to bring the various units thereof in proper alignment with the die cavities at a rate that is in a properly timed relationship to the reciprocation of the punches.

It is therefore desirable to provide a station positioner assembly in which the angular motion of the dispenser, anvil, and pickup head units is minimized, while at the same time increasing the rate of production of the compacted articles. Such is provided by the present invention.

SUMMARY OF THE INVENTION

The present invention provides a unitary block assembly, for use in conjunction with a powder compacting apparatus, which includes a plurality of powder dispensers, anvil surfaces, and pickup heads in a single relatively small and compact unit, with the diverse functional elements structurally arranged in such manner as to minimize the length of the arcuate motion described by the unitary block assembly.

It is therefore a principal object of the present invention to provide new and improved means for dispensing powder material to a plurality of die cavities, for the compaction of the powder material therein into compacted articles, and for the removal of the compacted articles from the die cavities in a manner which permits more accurate and reliable compacting operations, a greatly increased production rate, and a considerably reduced wear and tear of the parts in motion and of the driving means for imparting motion to such parts.

Other objects, advantages and applications of the present invention will become apparent to those skilled in the art when the accompanying description of an example of the best mode contemplated for practicing the invention is read in conjunction with the accompanying drawings.

BRIEF DESCRIPTION OF THE DRAWINGS

The description herein makes reference to the accompanying drawings wherein like reference numerals refer to like parts throughout the several views, and in which:

FIG. 1 is a partly schematic side elevational view of a portion of a powder compacting apparatus in accordance with the principles of the present invention;

FIG. 2 is a fragmentary top elevational view thereof;

FIG. 3 is a fragmentary view thereof from line 3—3 of FIG. 1;

FIG. 4 is a fragmentary cross-sectional view thereof taken along line 4—4 of FIG. 3;

FIG. 5 is a bottom plan view of the positioner assembly as seen from line 5—5 of FIG. 1;

FIG. 6 is a rear elevational view thereof as seen generally from line 6—6 of FIG. 5;

FIG. 7 is a fragmentary cross-sectional view thereof along line 7—7 of FIG. 6;

FIG. 8 is a fragmentary cross-sectional view thereof along line 8—8 of FIG. 6; and FIG. 9 is a fragmentary cross-sectional view thereof along line 9—9 of FIG. 6.

DESCRIPTION OF THE PREFERRED EMBODIMENT

Referring now to the drawings, and in particular to FIGS. 1–4, there is shown an example of the present invention in the form of a die and punch assembly 10, having a die plate 12 adapted to be seated in or on a table 13 which forms a portion of a powder compacting apparatus similar to the type disclosed in the aforementioned U.S. patents. The die plate has a flat upper surface 14 and is mounted on the table 13 by any suitable means such as clamps, screws or the like, as for example bolts 15. As can best be seen in FIG. 3, the die plate 12 is provided with two substantially parallel rows of apertures 18 and 19, the center of each aperture 18 and 19 being respectively disposed along parallel axes 20 and 21. As can best be seen in FIG. 4, each of the apertures 18 and 19 is provided with a cylindrically shaped die bushing 22 preferably formed of a hard material, such as a carbide, and which is retained within the apertures 18 and 19 by any suitable adhesive material disposed between the outer periphery of each die bushing and surface of each aperture.

Each of the die bushings 22 is disposed in its respective aperture 18 or 19, such that the upper surface of the die bushing is flush with the upper surface 14 of the die plate 12. Each die bushing 22 has a centrally disposed bore 24, which may be circular, rectangular, square, oval or any other appropriate cross section according to the desired peripheral shape of the article to be compacted therein.

The die plate 12 is further provided with a pair of diametrically opposed longitudinal bores 28 and 29 in which there is disposed one of a pair of downwardly extending support posts 32 and 34, the latter of which is clearly illustrated in FIG. 4. The support posts 32 and 34 are of an elongated cylindrical shape and retained within their respective bores by any suitable means, such as set screws 35, or otherwise fastened into the bores 28 and 29 such as by press-fit, or by means of an adhesive.

The die and punch assembly 10 further comprises a punch holder 36, which is provided with a centrally disposed countersunk bore 37 in which is disposed an internally threaded shouldered bushing 38 engaged with the externally threaded reduced diameter portion of an actuating rod 40. The punch holder 36 supports two parallel rows of punches 42 (only one punch is shown in FIG. 4), each punch being aligned within one of the die bushing bores 24 and all the punches being therefore adapted to be reciprocated in unison by means of the actuating rod 40. The punch holder 36 is slidably guided during its reciprocating motion by means of support posts 32 and 34. The support posts 32 and 34 further support a core rod holder 44 affixed to the support posts by means such as set screws 45, and which is provided with a central aperture 46 through which the actuating rod 40 reciprocates as it imparts motion to the punch support 36. The core rod holder 44 supports a plurality of core rods 48, each of which extends upwardly through coaxially aligned bores 41 in each punch 42, such that the core rods 48 are disposed for relative sliding movement with respect to the punches 42 as the punches are reciprocated under the action of the actuating rod 40. A plate member 50 is affixed at the lower ends of the support posts 32 and 34 by means, for example, of set screws 51, and has a central aperture 52 supporting a bushing 54 which provides further radial support for the actuating rod 40 as the rod is reciprocated. The actuating rod 40 is reciprocated by a ram member 55 driven by any convenient means such as, for example, cam members forming part of the press drive mechanism in the manner described in greater detail in the aforementioned U.S. patents. Since the drive mechanism forms no part of the present invention and is not necessary for the understanding of the invention, a detailed description thereof is deemed to be superfluous.

A positioner arm 56 is mounted on the end of a vertically disposed shaft 57 for pivotal sweeping reciprocating motion on top of the table 13 about a vertical axis 58 (FIG. 1), that is, for angular transverse movement across the upper surface 14 of the die plate 12 in a timed sequence with the reciprocal movement of the punches 42 as caused by the drive mechanism of the compacting press. The free end 60 of the positioner arm 56 supports a station positioner block 62, mounted in an appropriate recess 64 FIGS. 1 and 2) at the end 60 of the positioner arm 56 and retained in position by any suitable means, such as the bracket, spring and bolt assembly 66.

As can best be seen in further details in FIGS. 5–9, the positioner block 62 is preferably made of two portions, consisting of a main portion 70 made of cast iron, steel, or any other suitable material, and of a bottom face plate 72, preferably made of an ultra-hard material such as a carbide or the like, which is affixed to the bottom of the main block portion 70 by any conventional means such as countersunk bolts or screws, or by being cemented thereon by any convenient adhesive or like material. In the structure illustrated, the positioner block assembly 62 is provided with a pair of substantially parallel rows 74 and 76 of powder filler apertures 78, each of which, as best shown in FIG. 7, is formed in the bottom base plate 72, each row of filler apertures 78 being in communication with a manifold 80 formed in the main block portion 70 supplied in powder material from a source of powder material or primary hopper, not shown, by way of a flexible line 82 fitted to the end of a tubing 83 leading into the manifold 80. The position of each powder filler aperture 78 in each row 74 or 76 corresponds to each one of the die cavities 24

(shown schematically at FIG. 7, and also at FIGS. 8 and 9) (FIGS. 3 and 4), such that when the positioner block 62 is positioned over the die plate 12 for filling the die cavities 24 with powder, the row 74 of filler apertures 78 is disposed above the row 18 of die cavities 24 and the row 76 of filler apertures 78 is disposed over the row 19 of die cavities 24.

After the die cavities 24 have been filled with powder material from the manifold 80 through the filler apertures 78, the positioner block 26 is angularly displaced, by the action of the positioner arm 56 (FIGS. 1 and 2), to a position wherein flat surface portions 84 and 86 on the bottom of the face plate 72, which defines a pair of anvil surfaces, are disposed respectively above the row 18 and the row 19 of die cavities 24 (FIG. 8). The reciprocation of the punches 42 toward the anvil flat surfaces 84 and 86 compacts the powder material in the die cavities 24 between the end of the punches and the anvil surfaces 84 and 86. During compaction of the powder material between the end of the punches 42 and the anvil surfaces 84 and 86, a clamp member 88, dependent from the compacting press, is forcibly engaged with the top portion of the positioner block 62 so as to firmly apply the anvil surfaces 84 and 86 in engagement with the top surface 14 of the die plate 12.

After the compacted articles have been formed in the die cavities 24, the positioner block 62 is further displaced by the positioner arm 56 to a position placing a pair of parallel rows 90 and 92 of ejection or pickup apertures 94 over respectively the row 18 and the row 19 of the die cavities 24 (FIG. 9). The punches 42 are then reciprocated such that their ends are brought substantially flush with the top surface 14 of the die plate 12, thereby ejecting from each die cavity 24 a finished compacted article into a pickup aperture 94 formed in the face plate 72 of the positioner block 62, each pickup aperture 94 being connected by means of a passageway 96, a line 98 and a flexible tubing 100 (FIG. 5) to a source of vacuum, not shown, and to appropriate receptables, not shown, in which are collected the finished articles.

Each pickup aperture 94 of the row 90 is disposed at the end of a recessed groove 102 open at a side of the face plate 72, and each pickup aperture 94 of the row 92 is disposed at the end of a recessed groove 104, several grooves 104 leading into a recessed groove 105 open to a side of the face plate 72 of the positioner block 62, and the remaining of the grooves 104 leading into a second recessed groove 106 also open to a side of the face plate 72 of the positioner block 62, as best seen at FIG. 6, so as to allow a flow of atmospheric air into the pickup apertures 94 when the source of vacuum is turned on in properly timed relationship with the placement of the pickup apertures 94 over the die cavities 24 and ejection of the finished articles from the cavities into so as to lift the finished articles and suck them into the pickup apertures. The rows 90 and 92 of the pickup apertures 94 are substantially parallel to one another, but they are obviously at a slight angle to the rows 74 and 76 of the filler apertures 78 so as to provide accurate alignment with the rows 18 and 19 of die vacities when the positioner block 62 is angularly positioned from the filling position to the ejection position.

It is also obvious that because of the linear and parallel disposition of the die cavities 24 in the die plate 12, and of the filler apertures 78, pickup apertures 94 and anvil surfaces 84 and 86 integrally disposed in the positioner block assembly 62 instead of being separate functional units, there results a substantially compact mechanical assembly. The displacement of the positioner arm and of the positioner block 62 carried thereby for sequentially positioning over the die cavities the separate functional elements for filling the die cavities with powder, compacting the powder in the die cavities against the anvil surfaces, and ejecting and picking up the compacted articles, is effected with a minimum of angular motion because of the close proximity of the functional elements in the block face plate.

Although the punch and die assembly has been shown provided with only two parallel rows of die cavities and the positioner block has been shown and described with only a pair of rows or groups of functional elements, it will be obvious to those skilled in the art that the principle of the invention may be extrapolated such that a plurality of rows of die cavities may be provided in a die assembly, and corresponding pluralities of functional elements may be disposed in the positioner block.

We claim:

1. An apparatus for making an article of compacted powder material comprising a die plate having at least a first and a second die cavity adapted to be filled with powder material, said first and second die cavities being transversely spaced a given distance; a station positioner block transversely movable over said die cavities; at least first and second separate powder dispenser means integrally formed in said block for filling each die cavity with said powder material when said block is in a first transverse position; at least first and second separate anvil surfaces integrally formed in said block and each adapted to be placed over said first and second die cavities respectively when said block is in a second transverse position; compacting means in each of said die cavities for compacting said powder material in each die cavity against one of said anvil surfaces to form said article when said block is in said second transverse position; and at least first and second separate pickup means integrally formed in said block for picking up said article ejected from each die cavity when said block is in a third transverse position, wherein said second powder dispenser means, second anvil surface and second pickup means are respectively spaced from first powder dispenser means, first anvil surface, and first pickup means by said given distance, such that said second powder dispenser means, second anvil surface, and second pickup means are positioned sequentially over said second die cavity simultaneously with the sequential positioning of said first powder means, first anvil surface, and first pickup means over said first die cavity.

2. The apparatus defined in claim 1 wherein each of said powder dispenser means comprises a bore in said block normally filled with powder material, said bore having an aperture in the bottom surface of said block aligned with one of said die cavities when said block is in said first transverse position so as to fill each of said die cavities with said powder material, and each of said pickup means comprises an aperture formed in a recessed portion of the bottom surface of said block aligned with one of said die cavities when said block is in said third transverse position.

3. The apparatus defined in claim 1 wherein said die plate has at least a first plurality of die cavities arranged in a first array and a second plurality of die cavities arranged in a second array, said first plurality of die cavities being spaced from said second plurality of die cavities by said given distance; said station positioner block comprising a first and second pluralities of dispenser means disposed similarly to said first and second arrays and aligned with said first and second plurality of die cavities to fill same with said powder material when said block is in said first transverse position; said first plurality of dispenser means being spaced from said second plurality of dispenser means by said given distance, said first and second anvil surfaces of said block being placed over said first and second pluralities of die cavities when said block is in said second transverse position; said first and second pluralities of pickup means being disposed in said block similarly to said first and second arrays and aligned over said first and second pluralities of die cavities when said block is in said third transverse position, said first and second pluralities of pickup means being spaced from each other by said given distance.

4. The apparatus defined in claim 3 wherein said first plurality of die cavities in said die plate are arranged in a spaced, straight line configuration forming a first row of die cavities, and said second plurality of die cavities are arranged in a spaced, straight line configuration forming a second row of said die cavities.

5. The apparatus defined in claim 4 wherein said first and second rows of die cavities in said die plate are parallel.

6. The apparatus defined in claim 4 wherein said first and second dispenser means comprise a plurality of spaced apertures in the bottom of said block disposed in a straight line configuration forming first and second rows of apertures adapted to be respectively aligned with said first and second rows of die cavities when said block is in said first transverse position; and said first and second pluralities of pickup means each comprise a row of bores disposed in a straight line configuration, each row being aligned with a row of die cavities to receive the compacted articles ejected from each die cavity.

7. The apparatus defined in claim 6 wherein each of said anvil surfaces is located along the bottom surface of said block between a row of dispenser apertures and a row of pickup bores.

* * * * *